United States Patent
Martinez et al.

(10) Patent No.: US 9,442,291 B1
(45) Date of Patent: Sep. 13, 2016

(54) SEGMENTED DIFFRACTIVE OPTICAL ELEMENTS FOR A HEAD WEARABLE DISPLAY

(71) Applicant: Google Inc., Mountain View, CA (US)

(72) Inventors: Marc Andrew Martinez, East Palo Alto, CA (US); Ehsan Saeedi, Santa Clara, CA (US); Bernard C. Kress, Redwood City, CA (US)

(73) Assignee: Google Inc., Mountain View, CA (US)

( * ) Notice: Subject to any disclaimer, the term of this patent is extended or adjusted under 35 U.S.C. 154(b) by 183 days.

(21) Appl. No.: 13/930,845

(22) Filed: Jun. 28, 2013

(51) Int. Cl.
*G02B 27/01* (2006.01)
*G02B 5/18* (2006.01)

(52) U.S. Cl.
CPC ......... *G02B 27/0172* (2013.01); *G02B 5/1819* (2013.01)

(58) Field of Classification Search
CPC .... G02B 5/18; G02B 5/1814; G02B 5/1819; G02B 5/1861; G02B 27/01–27/0189; G02B 27/42–27/46; G02B 2027/0105–2027/0198
USPC ....... 359/1, 13–15, 462, 466, 471, 558, 563, 359/566, 569–576, 618, 629–633, 359/637–638; 345/7–9; 385/31, 37
See application file for complete search history.

(56) References Cited

U.S. PATENT DOCUMENTS

| | | |
|---|---|---|
| 4,218,111 A | 8/1980 | Withrington et al. |
| 4,220,400 A | 9/1980 | Vizenor |
| 4,560,233 A | 12/1985 | Banbury |
| 4,799,765 A | 1/1989 | Ferrer |
| 4,895,790 A * | 1/1990 | Swanson et al. ............. 430/321 |
| 4,968,117 A | 11/1990 | Chern et al. |
| 5,050,966 A | 9/1991 | Berman |
| 5,237,455 A | 8/1993 | Bordo et al. |

(Continued)

FOREIGN PATENT DOCUMENTS

| | | |
|---|---|---|
| EP | 0 898 726 B1 | 3/2000 |
| EP | 0 995 145 B1 | 9/2001 |

(Continued)

OTHER PUBLICATIONS

Rossi et al., "Refractive and diffractive properties of planar micro-optical elements," Applied Optics, vol. 34, No. 26, Sep. 10, 1995, pp. 5996-6007.*

(Continued)

*Primary Examiner* — Derek S Chapel
*Assistant Examiner* — Adam W Booher
(74) *Attorney, Agent, or Firm* — Blakely Sokoloff Taylor & Zafman LLP (57) ABSTRACT

An optical combiner for a head-wearable display includes an eyepiece body and a plurality of diffractive optical element ("DOE") segments. The eyepiece body has an eye-ward side and an external scene side. The DOE segments are disposed within the eyepiece body and are at least partially reflective to image light incident through the eye-ward side of the eyepiece body and at least partially transmissive to external scene light incident through the external scene side of the eyepiece body. The DOE segments are disjoint from each other and each is disposed along a different disjoint surface within the eyepiece body that is oriented at a different angle relative to the other DOE segments. The plurality of DOE segments operate to magnify and reflect the image light incident from an off-axis position to an eyebox sized area.

15 Claims, 9 Drawing Sheets

(56) References Cited

U.S. PATENT DOCUMENTS

| | | | |
|---|---|---|---|
| 5,257,133 A | 10/1993 | Chen | |
| 5,537,253 A | 7/1996 | Cox et al. | |
| 5,654,827 A | 8/1997 | Reichert | |
| 5,694,230 A | 12/1997 | Welch | |
| 5,821,911 A | 10/1998 | Jachimowicz | |
| 5,880,888 A | 3/1999 | Schoenmakers et al. | |
| 5,886,822 A | 3/1999 | Spitzer | |
| 5,923,476 A | 7/1999 | Heffner | |
| 5,943,171 A | 8/1999 | Budd et al. | |
| 5,949,583 A | 9/1999 | Rallison et al. | |
| 5,995,071 A | 11/1999 | Mertz | |
| 6,005,714 A | 12/1999 | Welch | |
| 6,057,966 A | 5/2000 | Carroll et al. | |
| 6,111,701 A | 8/2000 | Brown | |
| 6,147,807 A | 11/2000 | Droessler et al. | |
| 6,204,975 B1 | 3/2001 | Watters et al. | |
| 6,236,509 B1 | 5/2001 | Grandjean et al. | |
| 6,236,511 B1 | 5/2001 | Brown | |
| 6,330,118 B1 | 12/2001 | Daschner et al. | |
| 6,349,004 B1 | 2/2002 | Fischer et al. | |
| 6,353,503 B1 | 3/2002 | Spitzer et al. | |
| 6,396,639 B1 | 5/2002 | Togino et al. | |
| 6,462,882 B2 | 10/2002 | Chen et al. | |
| 6,466,471 B1 | 10/2002 | Bhattacharyya | |
| 6,687,057 B1* | 2/2004 | Yamazaki | 359/637 |
| 6,690,516 B2 | 2/2004 | Aritake et al. | |
| 6,728,036 B2* | 4/2004 | Kleemann et al. | 359/575 |
| 6,829,095 B2 | 12/2004 | Amitai | |
| 6,847,488 B2 | 1/2005 | Travis | |
| 6,885,503 B2* | 4/2005 | Yun et al. | 359/565 |
| 6,961,162 B2 | 11/2005 | Nakamura et al. | |
| 7,095,562 B1 | 8/2006 | Peng et al. | |
| 7,119,965 B1 | 10/2006 | Rolland et al. | |
| 7,145,726 B2 | 12/2006 | Geist | |
| 7,205,960 B2 | 4/2007 | David | |
| 7,230,766 B2 | 6/2007 | Rogers | |
| 7,450,310 B2 | 11/2008 | McGuire | |
| 7,542,209 B2 | 6/2009 | McGuire, Jr. et al. | |
| 7,551,335 B2* | 6/2009 | Schilling | B42D 25/328 283/86 |
| 7,566,863 B2 | 7/2009 | Chang et al. | |
| 7,586,686 B1 | 9/2009 | Hall | |
| 7,595,480 B2 | 9/2009 | Kress | |
| 7,595,933 B2 | 9/2009 | Tang | |
| 7,637,617 B2 | 12/2009 | Liu et al. | |
| 7,672,055 B2 | 3/2010 | Amitai | |
| 7,715,103 B2 | 5/2010 | Sprague et al. | |
| 7,724,442 B2 | 5/2010 | Amitai | |
| 7,777,960 B2* | 8/2010 | Freeman | 359/630 |
| 7,821,715 B2 | 10/2010 | Suzuki et al. | |
| 8,336,333 B2 | 12/2012 | Ushigome | |
| 8,384,999 B1 | 2/2013 | Crosby et al. | |
| 8,411,365 B2 | 4/2013 | Saito | |
| 2002/0186179 A1 | 12/2002 | Knowles | |
| 2006/0215244 A1 | 9/2006 | Yosha et al. | |
| 2007/0070859 A1 | 3/2007 | Hirayama | |
| 2009/0067057 A1 | 3/2009 | Sprague et al. | |
| 2010/0046075 A1 | 2/2010 | Powell et al. | |
| 2010/0079356 A1 | 4/2010 | Hoellwarth | |
| 2010/0149073 A1 | 6/2010 | Chaum et al. | |
| 2011/0213664 A1 | 9/2011 | Osterhout et al. | |
| 2011/0221656 A1 | 9/2011 | Haddick et al. | |
| 2012/0086623 A1* | 4/2012 | Takagi et al. | 345/7 |
| 2012/0212398 A1 | 8/2012 | Border et al. | |
| 2012/0212399 A1 | 8/2012 | Border et al. | |
| 2012/0249797 A1 | 10/2012 | Haddick et al. | |
| 2012/0293548 A1 | 11/2012 | Perez et al. | |

FOREIGN PATENT DOCUMENTS

| | | |
|---|---|---|
| EP | 1 930 762 A1 | 6/2008 |
| EP | 1 465 003 B1 | 12/2008 |
| WO | WO 2007/065995 A1 | 6/2007 |
| WO | WO 2009/153446 A2 | 12/2009 |
| WO | WO 2010/097439 A1 | 9/2010 |

OTHER PUBLICATIONS

Cakmakci, O. et al., "Head-Worn Displays: A Review", IEEE, Journal of Display Technology, vol. 2, No. 3, Sep. 2006, pp. 199-216.

Mukawa, H. et al., "8.4: *Distinguished Paper*: A Full Color Eyewear Display using Holographic Planar Waveguides", SID Symposium Digest of Technical Papers, May 2008, vol. 39, Issue 1, pp. 89-92.

Cakmakci, O. et al. "Design of a Freeform Single-Element Head-Worn Display", Proc. of SPIE vol. 7618, 761803, 2010, 6 pages.

Kress, B. et al., "Low Cost Replicable Plastic HUD combiner element", Photonics in the Transportation Industry: Auto to Aerospace II, Proc. SPIE vol. 7314, 73140I, Apr. 13, 2009, 8 pages, Orlando, Florida.

Kress, B. et al., "Digital combiner achieves low cost and high reliability for head-up display applications", SPIE Newsroom. DOI: 10.1117/2.1200904.1599, May 18, 2009, 3 pages.

Kress, B. et al., "Applied Digital Optics: From Micro-optics to Nanophotonics, Chapter 5: Digital Diffractive Optics: Analytic Type", 40 pages, 2009, John Wiley & Sons, Ltd.

Kress, B. et al., "Applied Digital Optics: From Micro-optics to Nanophotonics, Chapter 12: Digital Optics Fabrication Techniques", 74 pages, 2009, John Wiley & Sons, Ltd.

Kress, B. et al., "Applied Digital Optics: From Micro-optics to Nanophotonics, Chapter 14: Replication Techniques for Digital Optics", 27 pages, 2009, John Wiley & Sons, Ltd.

Kress, B. et al., "Applied Digital Optics: From Micro-optics to Nanophotonics, Chapter 16: Digital Optics Application Pools", 60 pages, 2009, John Wiley & Sons, Ltd.

Kress, B., "Sandwiched Diffractive Optical Combiner", U.S. Appl. No. 13/411,346, filed Mar. 2, 2012.

* cited by examiner

SEGMENTED DIFFRACTIVE OPTICAL ELEMENTS FOR A HEAD WEARABLE DISPLAY

TECHNICAL FIELD

This disclosure relates generally to the field of optics, and in particular but not exclusively, relates to head-worn displays.

BACKGROUND INFORMATION

In the field of optics, a combiner is an optical apparatus that combines two images together, from either the same side of the combiner (reflective/reflective, or transmissive/transmissive) or from the two different sides of the combiner (reflective/transmissive). Often times, optical combiners are used in heads up displays ("HUDs"), sometimes referred to as head mounted displays ("HMDs"), head wearable displays, or near-to-eye displays, which allow a user to view a display image superimposed over an external view. The HUD enables the user to view the display image without having to look away from her usual viewpoint. The term HUD originated from its use in avionics, which enables a pilot to view information while looking forward with his head up, as opposed to looking down at an instrument panel.

Conventional HUD combiner implementations include tilted dichroic plates, holographic combiners, transparent substrates used at an angle (e.g., beam splitters), and zero power shells. Two versions of combiners exist. The first version combines two fields without adding any optical power to either field (typically a tilted dichroic plate or zero power shell). The second version has optical power, in addition to the combining functionality. The optical power is used to form a virtual magnified image of a microdisplay located at a specific distance from the combiner. Field of view is set by the application requirements. The field of view and the desired microdisplay diagonal determine the focal length (inversely related to the optical power) of the optical combiner.

Holographic combiners that provide a high quality HUD are typically used in military applications, although their cost is relatively expensive. Holographic combiners can be fabricated by exposing a dichromated gelatin, silver halides, or photopolymers to a pair of intersecting laser beams (reference and object beams). The interference pattern between these beams is recorded into the holographic media thereby forming the holographic combiner after curing. Holographic combiners have a number of drawbacks. They are expensive to fabricate, difficult to mass produce, and have limited life spans (e.g., begin to degrade due to temperature, humidity, pressure and other harsh environmental conditions).

Angled transparent substrate combiners (e.g., beam splitters) have been used in automobiles to present the driver with HUD information on the windshield. These optical combiners are made of a clear see-through substrate upon which an external image source displays computer generated images ("CGI"). However, since the clear see-through substrate is typically a flat substrate without optical power so as not to distort the external FOV, the clear substrate must be angled (e.g., near 45 degrees) and bulky external magnification lenses are used to expand the display image over the display region. The bulky external lenses and angled nature of the clear see-through substrate combiners do not lend themselves well to compact arrangements, such as HMDs.

The above mentioned optical combiners each have their own respective drawbacks, which have limited their use to niche markets. In order to broaden the adoption of an HMD outside of a particular niche market, such an HMD should be implemented with a low cost optical combiner that is compact, lightweight, durable, and provide a good quality image without undue optical aberrations.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system, and method of fabrication of a diffractive optical combiner including a plurality of diffractive optical element ("DOE") segments are described herein. In the following description numerous specific details are set forth to provide a thorough understanding of the embodiments. One skilled in the relevant art will recognize, however, that the techniques described herein can be practiced without one or more of the specific details, or with other methods, components, materials, etc.

In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
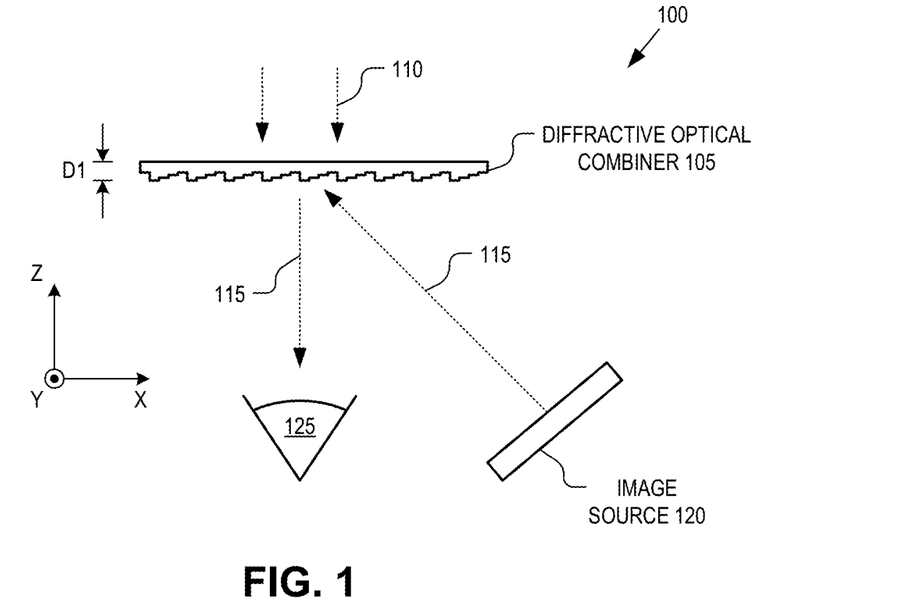
FIG. 1 illustrates an optical system with a diffractive optical combiner having a contiguous planar diffractive optical element ("DOE"), in accordance with an embodiment of the disclosure.

FIG. 1 illustrates an optical system 100 with a diffractive optical combiner 105 implemented with a contiguous planar diffractive optical element ("DOE"). Diffractive optical combiner 105 combines external scene light 110 incident through an external scene side of diffractive optical combiner 105 with reflected image light 115 incident on an eye-ward side of diffractive optical combiner 105. Thus, the user's eye 125 perceives external scene light 110 as being augmented by image light 115, generated by image source 120. The DOE of diffractive optical combiner 105 operates to reflect image light 115 at a designed angle back at eye 125, while allowing external scene light 110 to pass through substantially undisturbed or diffracted. The DOE on diffractive optical combiner 105 may further be designed to have optical power and apply a magnifying lensing function to image light 115. For example, the DOE may collimate or nearly collimate image light 115 so that the user can bring image light 115 easily into focus in a near-to-eye configuration, such as a head wearable display.

The contiguous planar DOE of diffractive optical combiner 105 is advantageous from an industrial design perspective because its thickness D1 is relatively thin. However, when a contiguous planar DOE is illuminated by image source 120 from an off-axis position (e.g., from a temple region in a near-to-eye display), undesirable optical aberrations may be induced in the reflected image light 115. Such optical aberrations include astigmatism, as well as others.

Figure 2:
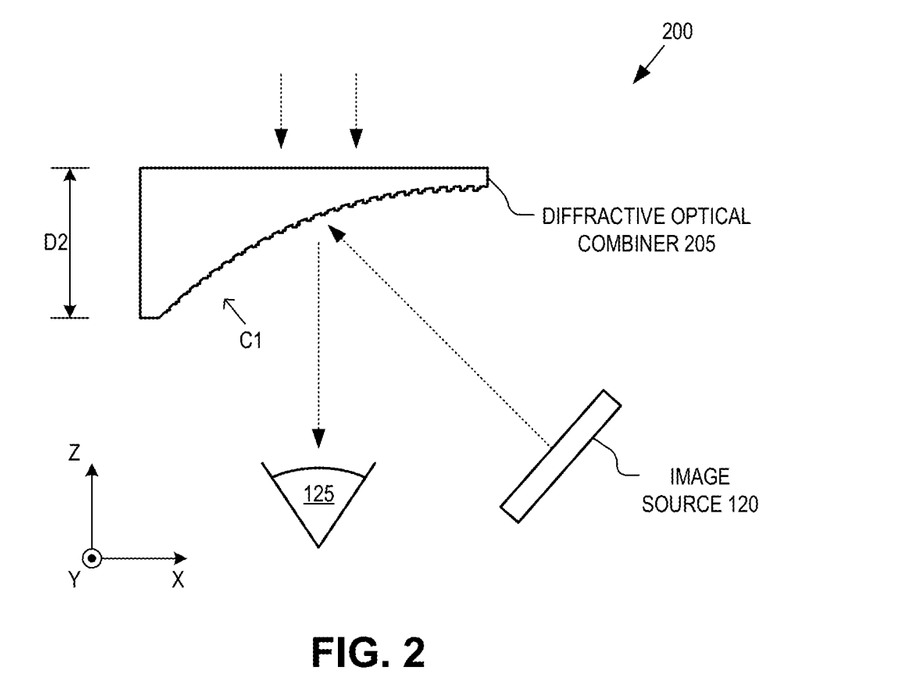
FIG. 2 illustrates an optical system with a hybrid diffractive optical combiner having a contiguous curved DOE, in accordance with an embodiment of the disclosure.

FIG. 2 illustrates an optical system 200 with a hybrid diffractive optical combiner 205 implemented with a contiguous curved DOE. Hybrid diffractive optical combiner 205 operates similar to diffractive optical combiner 205 in transmission; however, in reflection the curvature C1 of hybrid diffractive optical combiner 205 imparts optical power in addition to the optical power imparted by the DOE. This reflective curvature C1 can be designed to offset or reduce the optical aberrations caused by illumination from an off-axis position. For example, the curvature C1 may be designed to correct the astigmatism caused by the off-axis illumination of the DOE.

However, using a contiguous curved DOE, as illustrated in FIG. 2, results in hybrid diffractive optical combiner 205 having a thickness D2 that is substantially thicker than diffractive optical combiner 105. Thick eyepieces are generally considered less desirable from an industrial design perspective, as it causes the eyepiece to have a bug-eyed characteristic.

Figure 3:
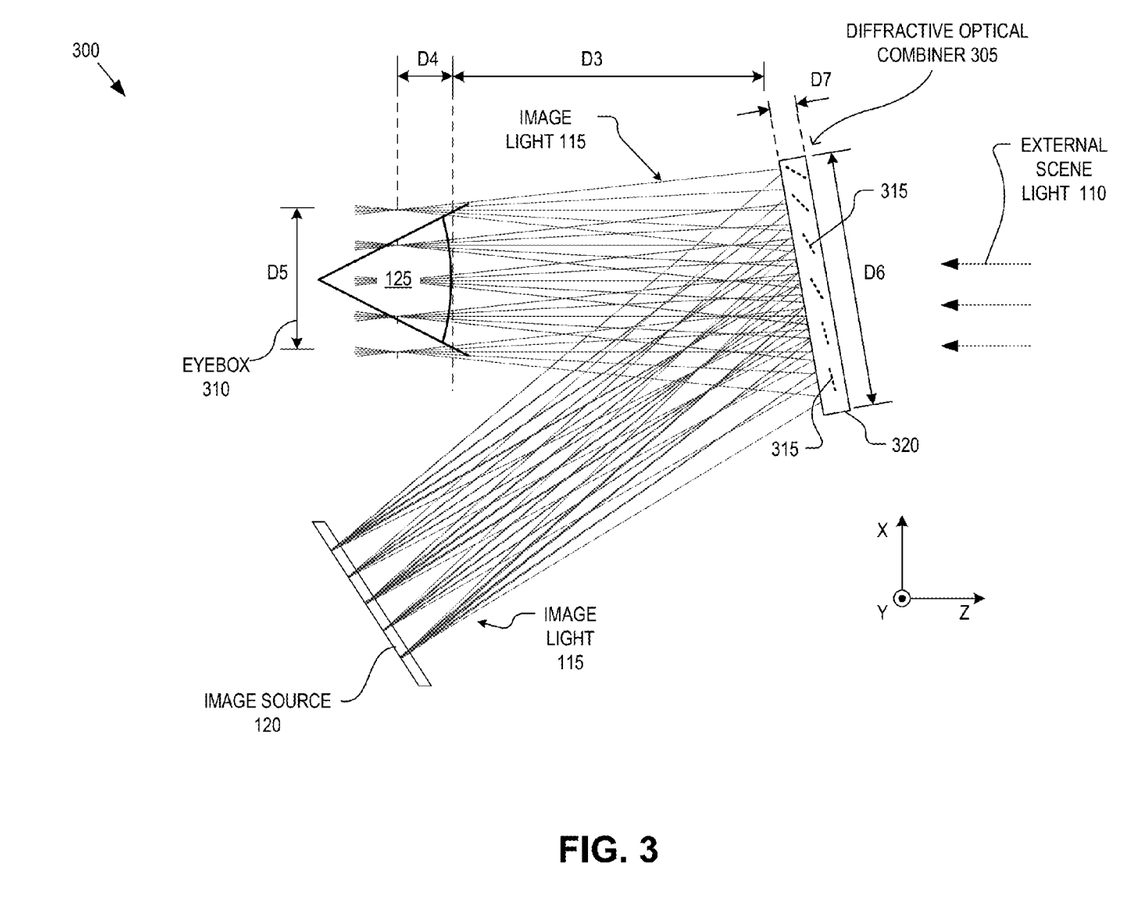
FIG. 3 illustrates an optical system including a diffractive optical combiner having DOE segments, in accordance with an embodiment of the disclosure.
Figure 6A:
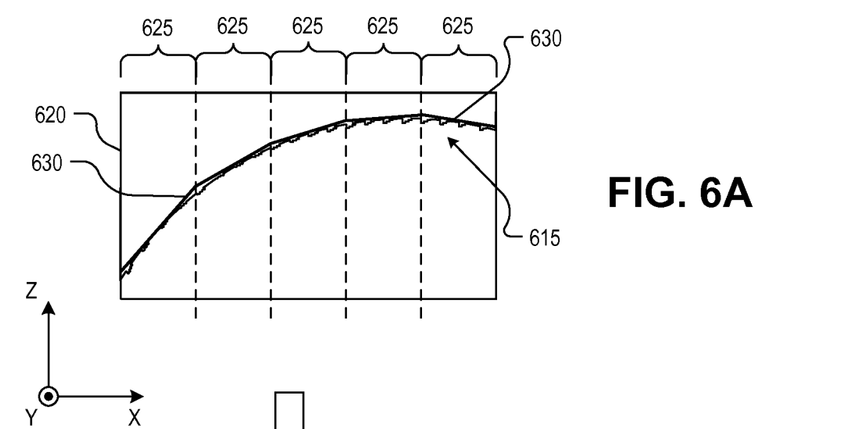
FIG. 6A illustrates how to segment a contiguous curved DOE into a plurality of planar DOE segments, in accordance with an embodiment of the disclosure.
Figure 6B:
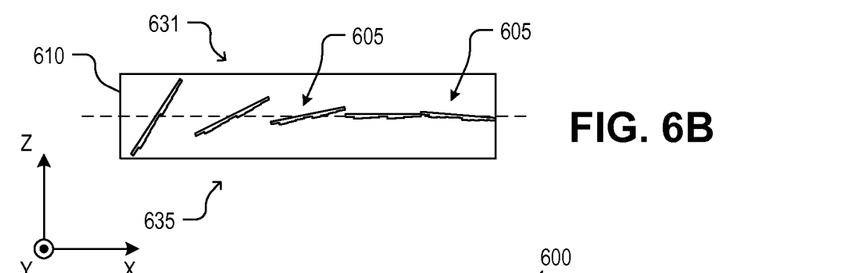
FIGS. 6B & 6C illustrate a diffractive optical combiner having a plurality of planar DOE segments, in accordance with an embodiment of the disclosure.
Figure 7:
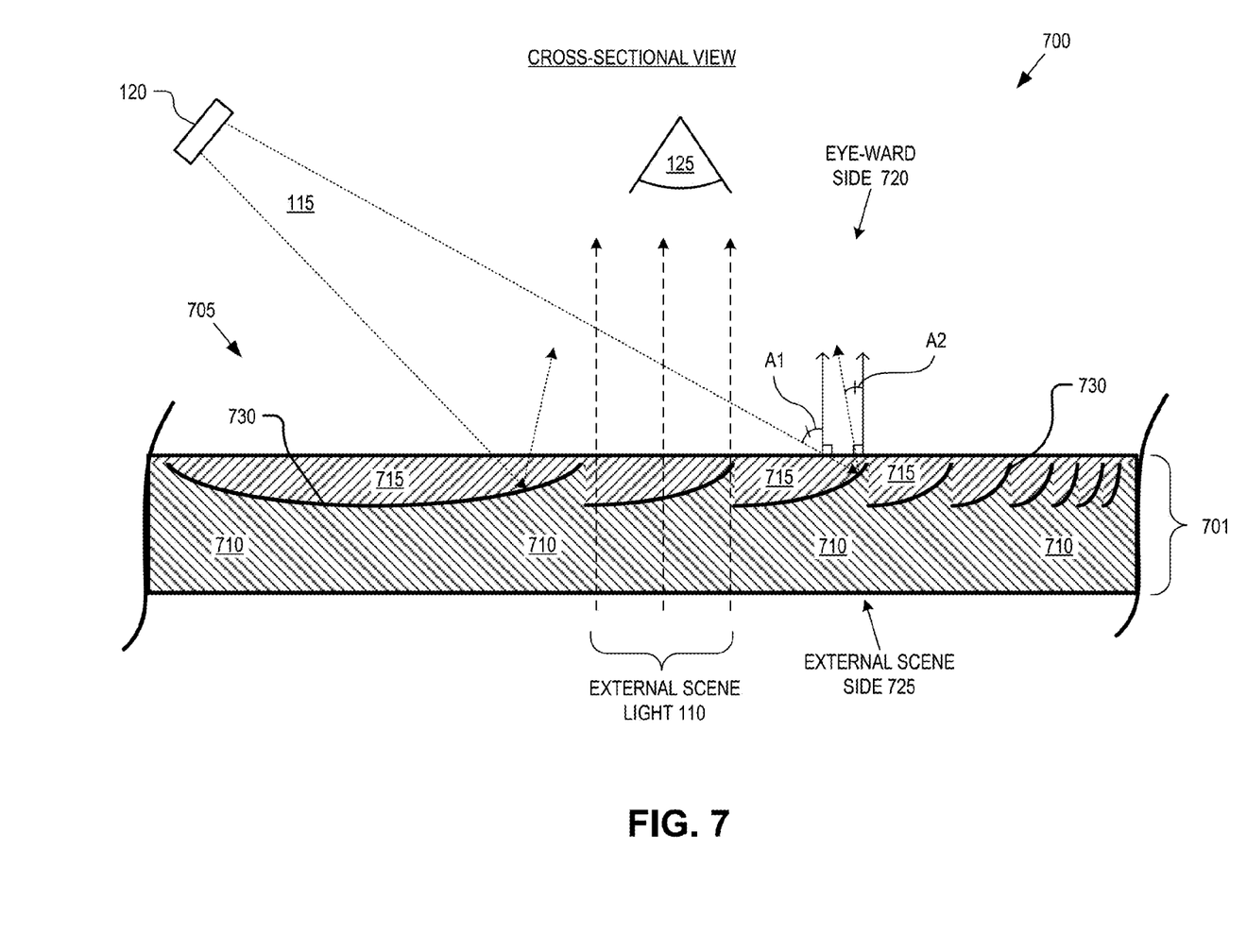
FIG. 7 illustrates layers of a DOE segment within an eyepiece body, in accordance with an embodiment of the disclosure.

FIG. 3 illustrates an optical system 300 including a diffractive optical combiner 305 implemented using DOE segments, in accordance with an embodiment of the disclosure. The illustrated embodiment of optical system 300 includes diffractive optical combiner 305 and image source 120. The illustrated embodiment of diffractive optical combiner 305 includes a plurality of DOE segments 315 embedded within an eyepiece body 320. Example implementations of diffractive optical combiner 305 are illustrated in FIGS. 4B, 6B, and 7, discussed in greater detail below.

During operation, image source 120 emits image light 115 along an emission path that directs image light 115 to be incident upon an eye-ward side of diffractive optical combiner 305 from an oblique or off-axis angle relative to a normal vector of the eye-ward side surface of diffractive optical combiner 305. Diffractive optical combiner 305 includes reflective diffraction gratings or DOE segments 315 that at least partially reflect image light 115 and collimate (or nearly collimate) image light 115 to an eyebox 310 setback from diffractive optical combiner 305 by an eye relief dimension of D3+D4, where the dimension D4 represents an approximate distance between the corneal surface and the pupil of eye 125. In the illustrated embodiment, diffractive optical combiner 305 magnifies image light 115 so that human eye 125 can view the magnified virtual image in a near-to-eye configuration. A frame assembly may be used to support the components of optical system 300 such that diffractive optical combiner 305 is positioned in front of a user's eye 125 by a distance that places the user's pupil within eyebox 310 having a dimension D5. For example, in one embodiment, D3 is approximately 21 mm while D5 is approximately 4 mm. Other dimensions for the eye relief and eyebox 310 may be implemented. Since the illustrated embodiment of optical system 300 is configured into a see-through near-to-eye display, diffractive optical combiner 305 is at least partially transmissive to external scene light 110 incident through an external scene side of diffractive optical combiner 305. Image light 115 is perceived by the user as an image that is superimposed over external scene light 110 (e.g., image light 115 augments external scene light 110).

Diffractive optical combiner 305 operates to overcome some of the shortcomings of the diffractive optical combiners 105 and 205 discussed above by using a plurality of DOE segments 315 instead of a single contiguous DOE that spans the length D6 of eyepiece body 320. By implementing diffractive optical combiner 305 using DOE segments 315, the individual DOE segments 315 can be repositioned within eyepiece body 320 to reduce the overall thickness D7 of eyepiece body 320. Reducing the thickness D7 improves the industrial design of eyepiece body 320 by reducing the bug-eye character associated with the contiguous curved DOE of diffractive optical combiner 200 illustrated in FIG. 2. For example, in one embodiment, the thickness D7 may be approximately 2 mm to 3 mm, while D6 may be approximately 20 mm along the horizontal and eyepiece body 320 may be 15 mm along the vertical y-axis (dimension not illustrated). Of course, other dimensions may be implemented.

Additionally, segmenting a single contiguous DOE into a plurality of DOE segments 315 provides an optical designer extra freedom in geometry to improve image quality and address optical aberrations that occur from off-axis illumination by image source 120. Since the individual DOE segments 315 are disjoint surfaces, they can be separately oriented or angled (e.g., see FIG. 4B or 6B) to ameliorate optical aberrations (e.g., astigmatism) due to off-axis illumination. In one embodiment, the individual DOE segments 315 may be curved surfaces (e.g., see FIG. 4B) to provide hybrid optical power in reflection due to both the curvature and diffractive grating structures to reduce optical aberrations from off-axis illumination.

By fabricating smaller DOE segments 315, versus the larger single contiguous DOEs illustrated in FIGS. 1 and 2, manufacturing tolerances can be tighter allowing for smaller feature sizes and reduced manufacturing costs. Maintaining precise control over the position and orientation of DOE segments 315 within eyepiece body 320 enables the optical phase relationship between each DOE segment 315 to be known and the phases of adjacent DOE segments 315 can be aligned to provide a continuous reflected image to eye 125.

The individual DOE segments 315 are reflective diffraction gratings formed along individual disjoint surfaces within eyepiece body 320. These surfaces can be curved (e.g., FIG. 4B) or planar (e.g., FIG. 6B) with two-dimensional ("2D") arrays of three-dimensional ("3D") diffraction element shapes disposed along the surfaces to form the individual diffraction gratings. In one embodiment, a reflective or partially reflective material is coated over the diffraction element shapes on each surface to create a reflective diffraction grating at each surface.

The phases of each diffraction grating can be controlled such that adjacent DOE segments 315 have diffraction gratings with phases that are aligned with each other and the DOE segments 315 collectively reflect a continuous image to eye 125 without undue discontinuities. In some embodiments, the edges of each diffraction grating are apodized to disguise discontinuities and improve the reflective image blending at the boundaries between adjacent DOE segments 315. Apodization may be achieved using a number of different techniques including reducing the reflectivity of the partially reflective material near the perimeter of each DOE segment 315 and/or thinning the diffraction element shapes themselves near the perimeter to reduce their efficiency around the edges.

In one embodiment, eyepiece body 320 is fabricated of an optically clear material that surrounds DOE segments 315 in a material having uniform index of refraction. Eyepiece body 320 may be fabricated of optical grade plastics (e.g., Zeonex Z-E48R), poly-methyl-metha-crylate (PMMA), glass, or otherwise. In one embodiment, the uniform refractive index material may be disposed on or bonded to other material layers for mechanical support or various other optical layers disposed on one or both sides (e.g., antireflection layers, tint layers, etc.).

Image source 120 may be fabricated using a variety of compact image source technologies such as the various micro-displays used today in pico-projectors, liquid crystal on silicon ("LCOS") displays, backlit liquid crystal displays, organic light emitting diode ("OLED") displays, quantum dot array displays, light emitting diode ("LED") arrays, or otherwise. Reflection of image light 115 off of diffractive optical combiner 305 causes color aberrations, also referred to as color separation or spectral spatial separation, as a result of the finite linewidth (or bandwidth) of image light 115 emitted by image source 120. Diffraction gratings exchange different diffraction angles for different wavelengths. Thus, color separation can be reduced or prevented by using a narrow linewidth lamp source, such as a laser source, or a narrow bandwidth optical filter. Additionally, tradeoffs can be made within DOE segments 315 themselves to reduce the color separation sensitivity. For example, the optical power provided by the diffraction gratings can be reduced, while the optical power provided by the curvatures of DOE segments 315 is increased. This optical power tradeoff between diffraction and reflective curvature can be designed to make the overall diffractive optical combiner 305 less susceptible to color separation and ease the color constraints on image source 120.

FIG. 3 illustrates the eye-ward side and external scene side surfaces of diffractive optical combiner 305 as being substantially planar and parallel. In some embodiments these surfaces may be curved and parallel (or nearly parallel) such that the two outer surfaces of eyepiece body 320 collectively provide zero diopter (optical power). Alternatively, the eye-ward side and external scene side surfaces may purposely have different curvatures (not illustrated) to provide optical power, such as provided by a corrective prescription. For example, the external scene side surface may be curved according to a corrective prescription.

Figure 4A:
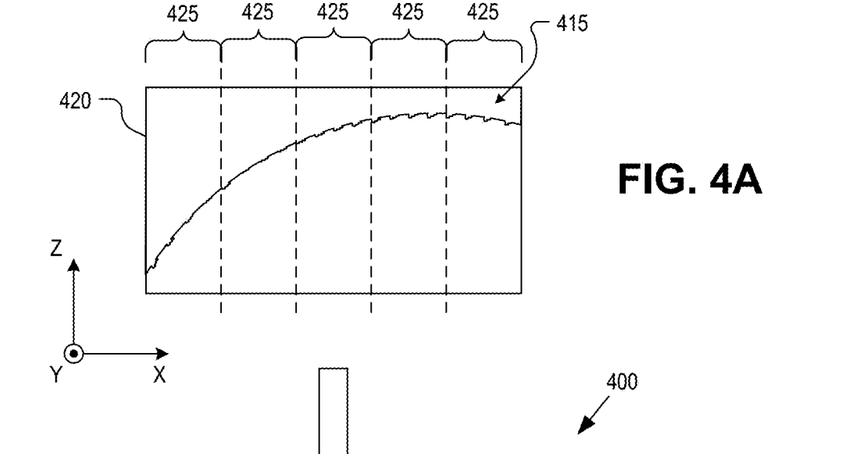
FIG. 4A illustrates how to segment a contiguous curved DOE into a plurality of curved DOE segments, in accordance with an embodiment of the disclosure.
Figure 4B:
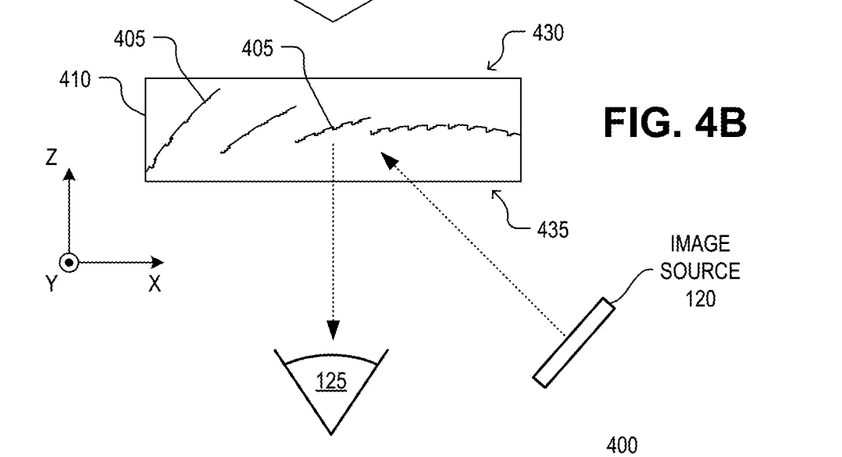
FIGS. 4B & 4C illustrate a diffractive optical combiner having a plurality of curved DOE segments, in accordance with an embodiment of the disclosure.
Figure 4C:
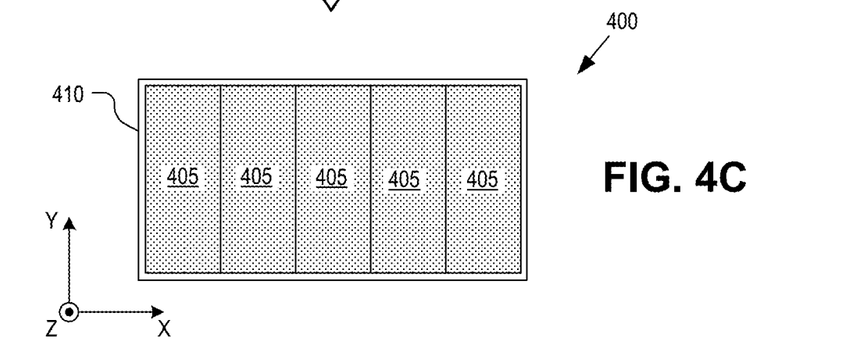

FIGS. 4B & 4C illustrate a diffractive optical combiner 400 having a plurality of curved DOE segments, in accordance with an embodiment of the disclosure. Diffractive optical combiner 400 is one possible implementation of diffractive optical combiner 305 illustrated in FIG. 3. FIG. 4B illustrates a top cross-sectional view of diffractive optical combiner 400 while FIG. 4C illustrates a side cross-sectional view of the same. The illustrated embodiment of diffractive optical combiner 400 includes curved DOE segments 405 embedded within an eyepiece body 410.

Curved DOE segments 405 may be designed by starting with a single contiguous curved DOE 415 as a reference (see FIG. 4A), which spans the whole eyepiece body 420. The curvature may be selected to provide a desired optical power to counteract optical aberrations induced by off-axis illumination of the diffraction grating of the contiguous curved DOE 415. Additionally, the amount of optical power imparted by the reflective curvature versus diffraction may also be selectively traded off.

Referring to FIG. 4A, contiguous curved DOE 415 is divided into a plurality of portions 425. FIG. 4A illustrates five such portions, but embodiments may include fewer or more such portions. Each portion 425 corresponds to a DOE segment 405 within eyepiece body 410. These portions 425 are then repositioned to collapse the curve so that they can be housed within eyepiece body 410 having a reduced thickness along the dimension extending from eye-ward side 435 to external scene side 430. Once portions 425 have been disjointed and repositioned, the grating phase, position, and tilt of each portion 425 can be fine-tuned using optical design CAD tools such as Zemax™, Code V™, or otherwise, to ensure acceptable reflective image quality is achieved by the DOE segments 405. The CAD tools may be configured with constraints on the required image quality, thickness of eyepiece body 410, and shadowing constraints (discussed below in connection with FIG. 5).

Figure 5:
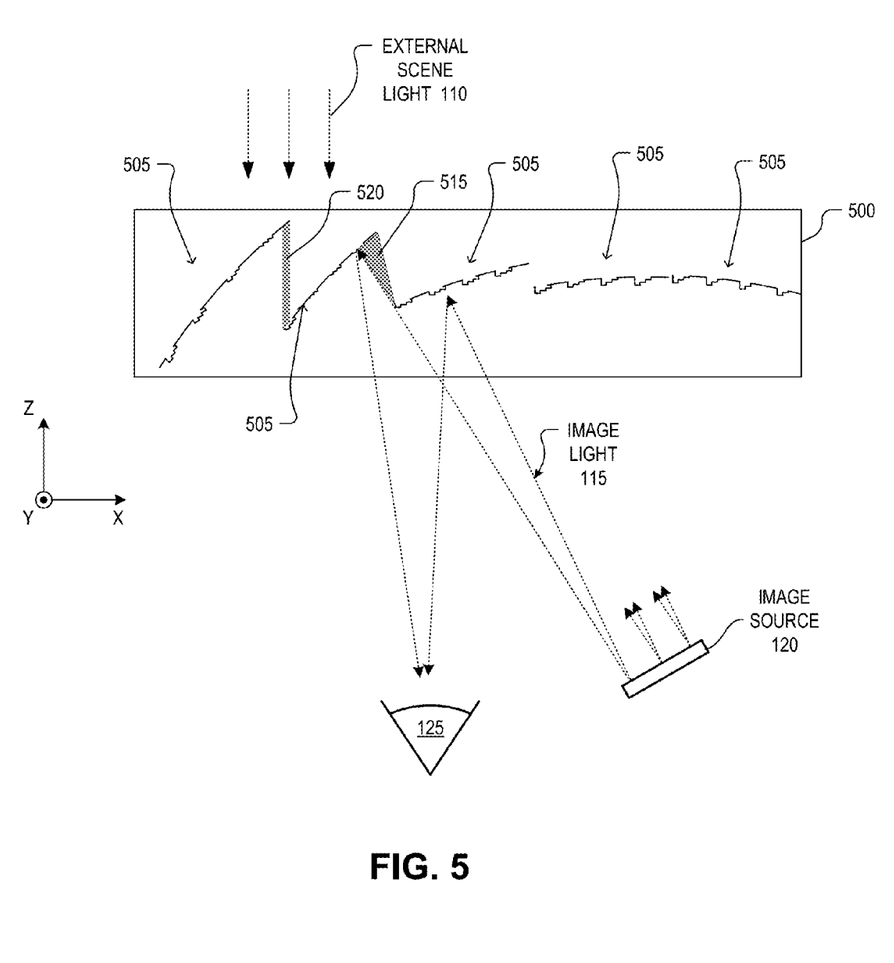
FIG. 5 illustrates how to position and orient curved DOE segments within an eyepiece body to reduce shadowing, in accordance with an embodiment of the disclosure.

FIG. 5 illustrates a rule of thumb to position and orient DOE segments 505 within an eyepiece body 500, in accordance with an embodiment of the disclosure. In general DOE segments 505 should be positioned relative to each other and image source 120 to reduce shadows. In a see-through embodiment, DOE segments 505 are coated with a partially reflective material (e.g., 20/80 beam splitter layer of silver or CrO2), which reflects a portion of incident light and passes a portion of incident light. As such, overlaps between adjacent DOE segments 505 can cause shadows 515 cast by image source 120 and shadows 520 cast by external scene light 110. These shadows 515 and 520 can result in non-uniform lighting and poor image quality due to unwanted reflections. Accordingly, care should be taken to reduce or minimize shadows 515 and 520 by appropriate selection of the geometries between image source 120 and DOE segments 505.

Figure 6C:
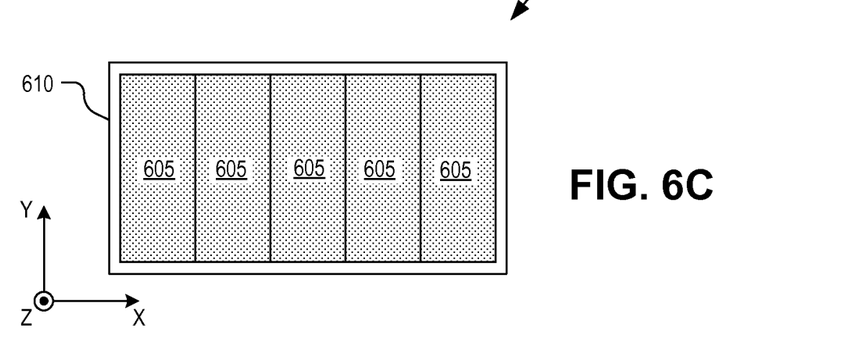

FIGS. 6B & 6C illustrate a diffractive optical combiner 600 having a plurality of planar DOE segments, in accordance with an embodiment of the disclosure. Diffractive optical combiner 600 is one possible implementation of diffractive optical combiner 305 illustrated in FIG. 3. FIG. 6B illustrates a top cross-sectional view of diffractive optical combiner 600 while FIG. 6C illustrates a side cross-sectional view of the same. The illustrated embodiment of diffractive optical combiner 600 includes planar DOE segments 605 embedded within an eyepiece body 610.

Planar DOE segments 605 may be designed by starting with a single contiguous curved DOE 615 as a reference (see FIG. 6A), which spans the whole eyepiece body 620. Contiguous curved DOE 615 is divided into a plurality of portions 625. FIG. 6A illustrates five such portions, but embodiments may include fewer or more such portions. Each portion 625 corresponds to a DOE segment 605 within eyepiece body 610. Each portion is then approximated with a planar DOE portion 630 that is approximately tangent to a center of its respective curved portion 625. These planar DOE portions 630 are then repositioned to collapse the curve so that they can be housed within eyepiece body 610 having a reduced thickness along the dimension extending from eye-ward side 635 to external scene side 631. Once planar DOE portions 625 have been disjointed and repositioned, the grating phase, position, and tilt of each planar DOE portion 625 can be fine-tuned using optical design CAD tools such as Zemax™, Code V™, or otherwise, to ensure acceptable reflective image quality is achieved by the DOE segments 605. The CAD tools may be configured with constraints on the required image quality, thickness of eyepiece body 610, and shadowing constraints (as discussed above in connection with FIG. 5).

Thus FIGS. 6A-C illustrates a planar variant to the curved segmentation approach illustrated in FIGS. 4A-C. The planar DOE portions 625 are arranged to approximate the shape of the contiguous curved DOE 615 and then repositioned and fined tuned as planar DOE segments 605 to reduce the thickness of the eyepiece body. An advantage of this planar approximation technique is that diffraction gratings can be fabricated on planar surfaces in a cost effective manner with high degree of pattern accuracy and fidelity, even in the sub-optical wavelength regime.

Figure 8:
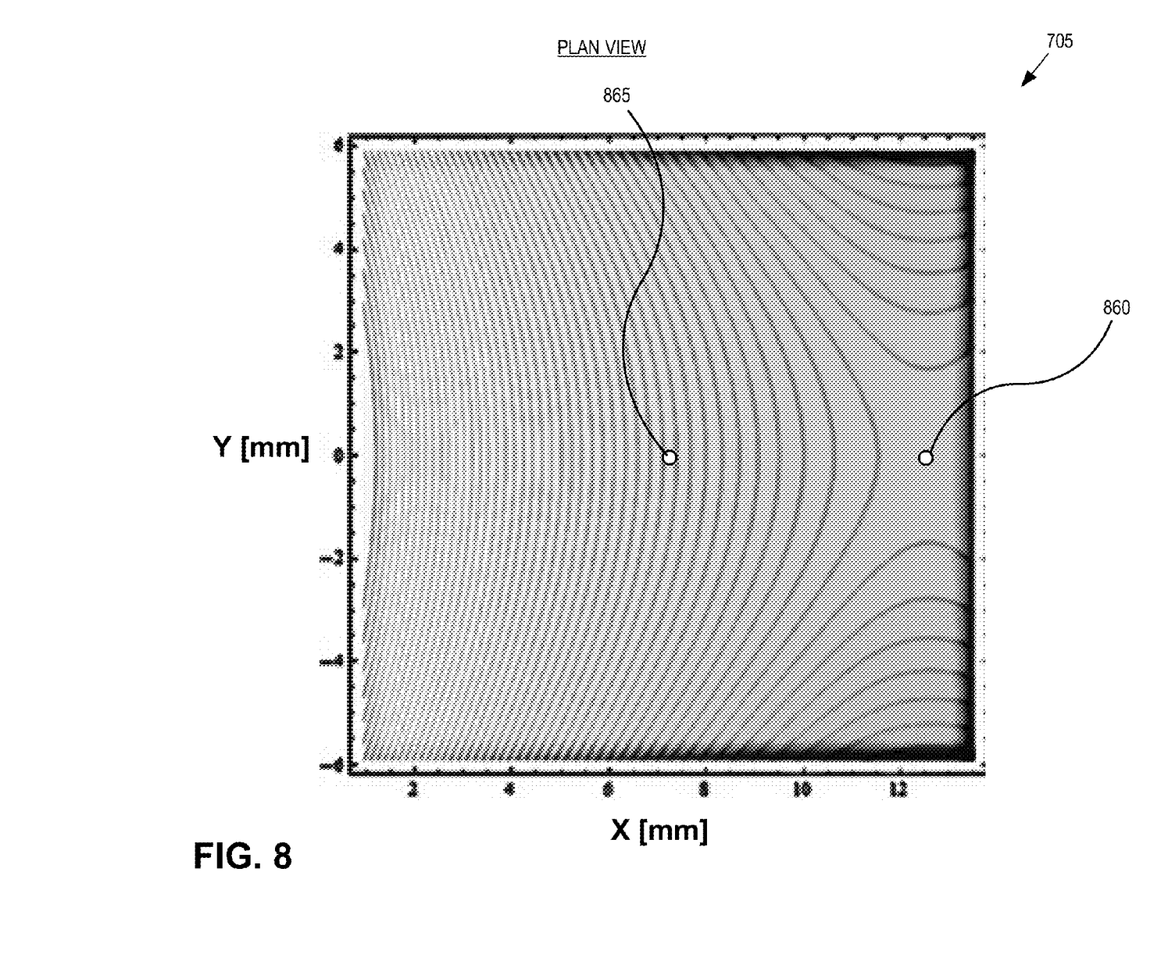
FIG. 8 illustrates a plan view of a DOE segment, in accordance with an embodiment of the disclosure.

FIG. 7 illustrates a portion of a diffractive optical combiner 700 including a DOE segment 705 disposed within a portion of an eyepiece body 701, in accordance with an embodiment of the disclosure. Diffractive optical combiner 700 is a see-through implementation. FIG. 7 illustrates a cross-sectional view of the portion of diffractive optical combiner 700 while FIG. 8 illustrates a plan view of the same. Diffractive optical combiner 700 is one possible implementation of diffractive optical combiner 305 (illustrated in FIG. 1) and correspondingly, DOE segment 705 is one possible implementation of DOE segment 315 while eyepiece body 701 is one implementation of eyepiece body 320.

The illustrated portion of eyepiece body 701 includes a base sandwich layer 710 and a planarization sandwich layer 715 between which the structures of DOE segment 705 are sandwiched. The top side of planarization sandwich layer 715 is referred to as the eye-ward side 720 while the bottom side of base sandwich layer 710 is referred to as the external scene side 725. The illustrated embodiment of DOE segment 705 is a reflective diffraction grating formed of a two-dimensional ("2D") array of three-dimensional ("3D") diffraction element shapes formed into base sandwich layer 710 with partially reflective elements 730 coated onto the 3D diffraction element shapes and conforming thereto.

DOE segment 705 is a reflective diffraction grating sandwiched between two material layers (i.e., base sandwich layer 710 and planarization sandwich layer 715) having substantially equal, if not identical, indexes of refraction. By doing this, diffractive optical combiner 700 simultaneously operates in both reflection and transmission modes with each mode having different characteristics. In reflection, image source 120 is positioned on the same side of diffractive optical combiner 700 as the user's eye 125 (i.e., eye-ward side 720). Since DOE segment 705 is composed of partially reflective elements 730, a portion of image light 115 output from image source 120 is reflected back towards the user's eye 125. In transmission, the diffractive effects of DOE segment 705 are eliminated by using the same or similar index of refraction material above and below partially reflective elements 730. Since partially reflective elements 730 are also partially transmissive and sandwiched in substantially uniform index material(s), the portion of external scene light 110 that passes through DOE segment 705 is not diffracted, but rather passes to eye 125 substantially without experiencing optical distortion or power. By simultaneously operating diffractive optical combiner 700 in both reflective and transmissive modes, it can be used to overlay image light 115 onto external scene light 110 to provide a type of augmented reality to the user.

If the 3D diffraction element shapes of DOE segment 705 are formed along a curved surface of base sandwich layer 710, then DOE segment 705 provides hybrid optical power due to the reflective curvature and due to the diffraction grating structures disposed along the curvature. The curvature can be selected to balance or otherwise compensate for various optical aberrations induced by the diffraction grating structures when illuminated from an off-axis position.

The shape, size, orientation, and placement of the individual 3D diffraction element shapes formed into base sandwich layer 710 may be designed to provide optical power for magnifying image light 115. This magnifying configuration may be particularly useful in near-to-eye configurations, such as head mountable/wearable displays ("HMDs") and some types of heads up displays ("HUDs"), such as scopes. The generic design of diffraction gratings that provide optical power is well known. For example, design of diffractive optics is discussed in "Applied Digital Optics: From Micro-optics to Nanophotonics" by Bernard Kress and Patrick Meyrueis, published by John Wiley and Sons in 2009. In particular, this book discusses how to design and subsequently carve out diffraction structures (microscopic grooves) and select their depth to maximize the amount of light diffracted in a specific diffraction order, while reducing the light diffracted in the zero and higher diffraction orders.

As mentioned above, DOE segment 705 is an off-axis lens, which is capable of receiving input light at incident angle A1 and reflects the image light along a reflection path having an emission angle A2 that is different from A1. In other words, each DOE segment (only one is illustrated in FIG. 7) can redirect the incident light at an angle that is not equal to the incident angle, in contrast to a traditional mirror where the incident and reflected angles are always equal. Note, A1 and A2 are measured along the chief ray of display source 120 relative to a normal of each surface along which the grading structures are formed. In FIG. 7, the surface of DOE structures 730 is substantially parallel with eye-ward side 720 of planarization sandwich layer 715. In HMD configurations, off-axis geometries permit image display 120 to be positioned peripherally in the temple region of the user thereby not obstructing the user's forward vision. Off-axis optical power using diffractive optics also provides a specific angular bandwidth to a reflective diffraction grating. This helps reduce distractions due to backside reflections and improve contrast of the reflected image light 115 over external scene light 110. DOE segment 705 may have a phase that is rotationally asymmetric.

In FIG. 8, the off-axis optical power is provided by chirping the diffraction grating pattern of each DOE segment and offsetting the center 860 of the diffraction pattern relative to the user's center of vision 865. In the illustrated embodiment, the pattern center 860 is denoted as the center of the largest partially reflective element 730. As the pattern extends out from center 860, partially reflective elements 730 become gradually smaller. In FIG. 7, the 3D diffraction element shapes have parabolic cross-sectional shapes and rotationally symmetric (circular or spherical) or rotationally asymmetric (aspheric) perimeter shapes. However, other cross-sectional shapes and perimeter shapes (e.g., elliptical, etc.) may be used to create grating shapes of DOE segment 705. In one embodiment, DOE segment 705 is defined by the following phase polynomial:

$$\phi_{i,j}(x, y) = \sum_{\substack{m=1 \\ n=1}}^{\substack{m=M \\ n=N}} (P_{m,n})_{i,j} x^m y^n \quad \text{(Eq. 1)}$$

where x, y and z are the spatial coordinates along the surface of base sandwich layer 710 upon which the DOE segment 705 is formed and $(P_{m,n})_{i,j}$ are a set of polynomial coefficients.

DOE segment 705 is formed by overlaying each 3D diffraction element shape with a partially reflective element 730. Partially reflective elements 730 each conformally coat a corresponding 3D diffraction element shape thereby creating a reflective structure that assumes the shape and orientation of the underlying 3D diffraction element shape. Partially reflective elements 730 may be made of a variety of different materials. In one embodiment, partially reflective elements 730 are fabricated of a layer of conventional non-polarizing beam splitter material (e.g., thin silver layer, CrO2, etc.). The degree of reflectivity may be selected based upon the particular application (e.g., primarily indoor use, outdoor use, combination use, etc.). In one embodiment, partially reflective elements 730 comprise a 10% reflective 100 nm layer of CrO2.

In one embodiment, partially reflective elements 730 are fabricated of a multi-layer dichroic thin film structure. Dichroic films can be created to have a selectable reflectivity at a selectable wavelength. Additionally, the dichroic film can be designed to improve the angle selectivity of the DOE segment 705. A dichroic film can be designed with high reflectivity to a specific wavelength or wavelength band that overlaps with image light 115 and to the angles of incidence of image light 115, while being substantially more transparent to other visible spectrum wavelengths and to the normal incidence of external scene light 110. In this manner, the efficiency of diffractive optical combiner 700 can be improved while also increasing the brightness of the transmitted external scene light 110.

In one embodiment, partially reflective elements 730 are fabricated of polarizing beam splitter material that substantially reflects one linear polarization of incident light while substantially passing the orthogonal linear polarization. In this case, image source 120 could be designed to emit polarized image light matching the reflection characteristic of partially reflective elements 730. Since ambient light typically has a random polarization, approximately 50% of external scene light 110 would pass through diffractive optical combiner 700 to eye 125.

Referring back to FIG. 3, diffractive optical combiner 305 may be fabricated using a variety of different fabrication techniques. For example, single-point diamond turning ("SPDT") could be used to form the planar or curved disjoint surfaces of each DOE segment 315 in a base sandwich layer of eyepiece body 320. The individual 3D diffraction element shapes of each DOE segment 315 may also be formed in the disjoint surfaces using SPDT. Subsequently, a partially reflective coating would be formed over the grating structures and a planarization sandwich layer having the same index of refraction as the base sandwich layer formed over the partially reflective coating.

Alternatively, each surface associated with a given DOE segment 315 could be fabricated using SPDT or polishing on the base sandwich layer of eyepiece body 320. These structures would then be aligned to and the grating structures of the DOE would be fabricated onto the surface using electron beam lithography, direct laser ablation, or optical lithography. Again, a partially reflective coating would be formed over the grating structures and a planarization sandwich layer having the same index of refraction as the base sandwich layer formed over the partially reflective coating.

In yet another embodiment, flexible DOE gratings could be fabricated and adhered to the disjoint surfaces of DOE segments 315 using embossing techniques. Additionally, the base sandwich layer and planarization sandwich layers of eyepiece body 320 could be fabricated using injection molding of optical grade plastics.

Figure 9:
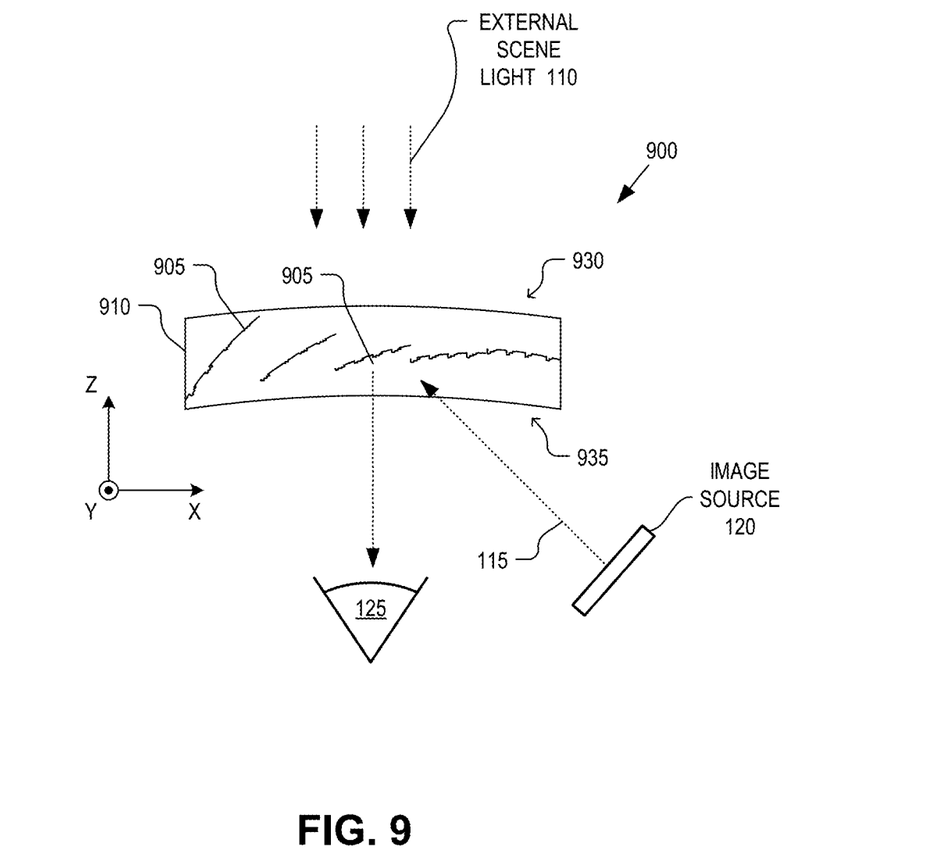
FIG. 9 illustrates a diffractive optical combiner having a plurality of DOE segments and curved surfaces, in accordance with an embodiment of the disclosure.

FIG. 9 illustrates a diffractive optical combiner 900 having a plurality of DOE segments and curved surfaces, in accordance with an embodiment of the disclosure. Diffractive optical combiner 900 is one possible implementation of diffractive optical combiner 305 illustrated in FIG. 3. The illustrated embodiment of diffractive optical combiner 900 includes DOE segments 905 embedded within an eyepiece body 910. DOE segments 905 may be implemented as curved DOE segments (illustrated) or planar DOE segments (not illustrated).

The illustrated embodiment of eyepiece body 910 further includes a curved external scene side surface 930 and a curved eye-ward side surface 935. Curved surfaces 930 and 935 may be curved and parallel (or nearly parallel) such that the surfaces 930 and 935 collectively provide zero refractive diopter (optical power). Curving surfaces 930 and 935 improves the industrial design of diffractive optical combiner 900 and can reduce incidence angles on eye-ward side surface 935 thereby providing higher reflectance of image light 115 into eye 125 by diffractive optical combiner 900.

In other embodiments, curved external scene side surface 930 and curved eye-ward side surface 935 are purposely designed with different curvatures to provide refractive optical power, such as provided by a corrective prescription. DOE segments 905 do not contribute to the refractive prescriptive lensing of external scene light 110 provided by the curvatures of surfaces 930 and 935. In some embodiments, only one of surfaces 930 and 935 is curved while the other is planar (not illustrated).

Figure 10:
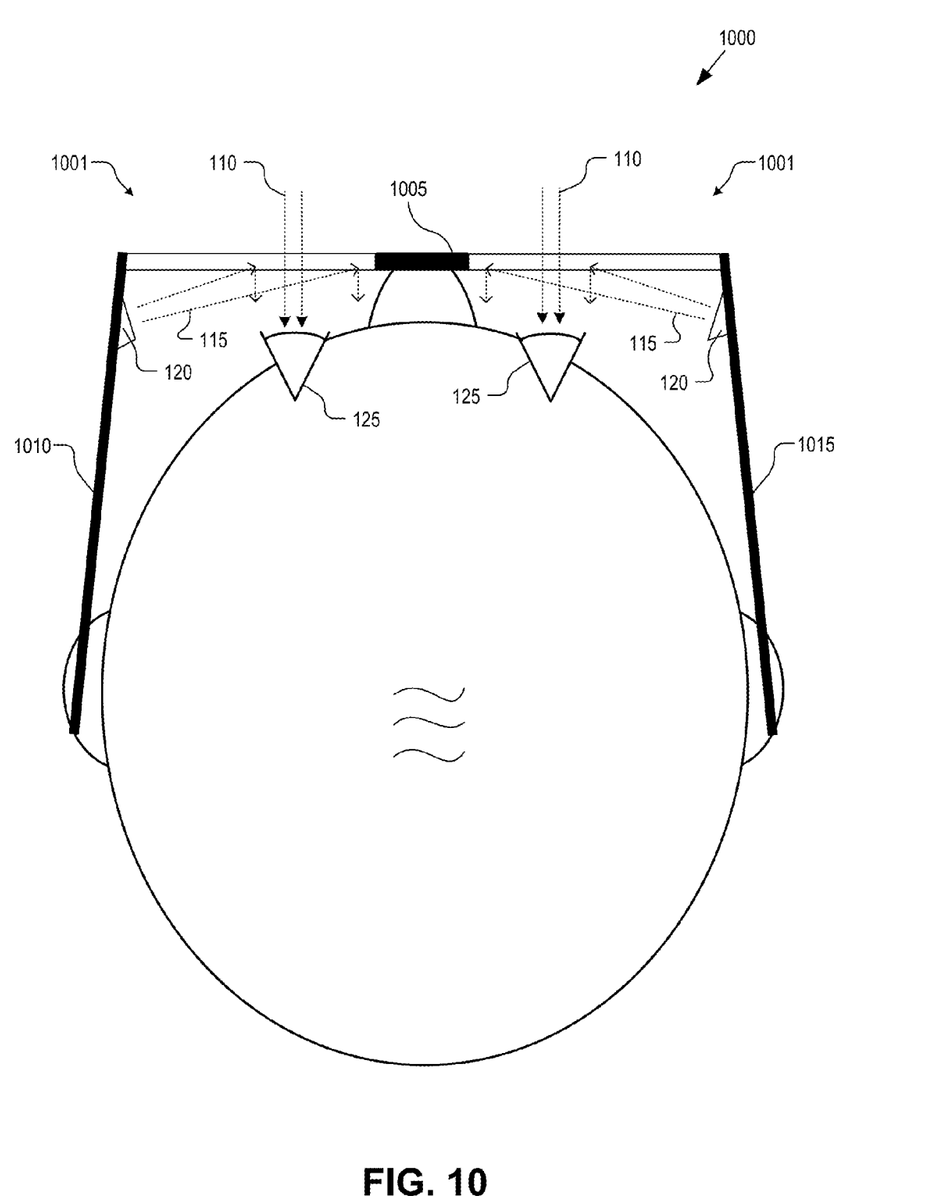
FIG. 10 is a top view illustration of a binocular head wearable display using two see-through displays that each include a plurality of DOE segments embedded within an eyepiece body, in accordance with an embodiment of the disclosure.

FIG. 10 is a top view illustration of a binocular head wearable display 1000 using two see-through displays 1001 that each include a plurality of DOE segments embedded within an eyepiece body, in accordance with an embodiment of the disclosure. Each see-through display 1001 may be implemented with embodiments of optical system 300 as discussed herein. The see-through displays 1001 are mounted to a frame assembly, which includes a nose bridge

1005, left ear arm 1010, and right ear arm 1015. Although FIG. 10 illustrates a binocular embodiment, display 1000 may also be implemented as a monocular display.

The see-through displays 1001 are secured into an eye glass arrangement or head wearable display that can be worn on the head of a user. The left and right ear arms 1010 and 1015 rest over the user's ears while nose bridge 1005 rests over the user's nose. The frame assembly is shaped and sized to position each diffractive optical combiner in front of a corresponding eye 125 of the user. Other frame assemblies having other shapes may be used (e.g., a visor with ear arms and a nose bridge support, a single contiguous headset member, a headband, goggles type eyewear, etc.).

The illustrated embodiment of display 1000 is capable of displaying an augmented reality to the user. Each see-through display 1001 permits the user to see a real world image via external scene light 110. Left and right (binocular embodiment) image light 115 may be generated by image sources 120 mounted to left and right ear arms 1010. Image light 115 is seen by the user as a virtual image superimposed over external scene light 110 as an augmented reality. In some embodiments, external scene light 110 may be fully, partially, or selectively blocked to provide sun shading characteristics and increase the contrast of image light 115.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical combiner for a head-wearable display, comprising:
    an eyepiece body having an eye-ward side and an external scene side; and
    a plurality of diffractive optical element ("DOE") segments disposed within the eyepiece body, wherein the DOE segments are at least partially reflective to image light incident through the eye-ward side of the eyepiece body and at least partially transmissive to external scene light incident through the external scene side of the eyepiece body, wherein the DOE segments are disjoint from each other and each of the DOE segments is a diffraction grating disposed along a different disjoint surface within the eyepiece body that is oriented at a different angle relative to the different disjoint surfaces of the other DOE segments, wherein the plurality of DOE segments operate to magnify and reflect the image light incident from an off-axis position to an eyebox sized area,
    wherein each of the different disjoint surfaces is a curved surface and each of the DOE segments is a reflective diffraction grating disposed on a different disjoint curved surface, wherein each of the DOE segments is a hybrid optical element that provides optical power in reflection due in a first part to a curvature of the curved surface and due in a second part to diffraction from the reflective diffraction grating disposed on the curved surface.

2. The optical combiner of claim 1, wherein the curvature of the curved surface is selected to have optical power that at least partially corrects for astigmatism caused by the reflective diffraction grating when illuminated by the image light from an off-axis position.

3. The optical combiner of claim 1, wherein the eye-ward side and an external scene side of the eyepiece body impart substantially zero optical power to the external scene light that passes through the eyepiece body.

4. The optical combiner of claim 1, wherein the external scene side of the eyepiece body is curved relative to the eye-ward side of the eyepiece body to impart corrective optical power to the external scene light that passes through the eyepiece body according to a prescription.

5. The optical combiner of claim 1, wherein the eyepiece body comprises a clear material.

6. The optical combiner of claim 5, wherein the eyepiece body comprises a material having a uniform index of refraction and surrounds the DOE segments on all sides.

7. The optical combiner of claim 6, wherein the DOE segments each comprise:
    a two-dimensional ("2D") array of three-dimensional ("3D") diffraction element shapes disposed along a corresponding one of the different disjoint surfaces within the eyepiece body; and
    partially reflective elements each coating one of the 3D diffraction element shapes and conforming thereto, wherein the partially reflective elements collectively form a reflective diffraction grating having magnifying optical power for the image light incident through the eye-ward side of the eyepiece body, wherein the partially reflective elements pass the external scene light incident through the external scene side substantially without diffraction.

8. The optical combiner of claim 1, wherein each of the DOE segments comprises a reflective diffraction grating having apodized edges to reduce an efficiency of the reflective diffraction grating around a perimeter of the reflective diffraction grating.

9. The optical combiner of claim 8, wherein the apodized edges reduce the efficiency of the reflective diffraction grating around the perimeter by one of reducing a reflectivity of a reflective coating on the reflective diffraction grating near the perimeter or thinning grating structures of the reflective diffraction grating near the perimeter.

10. A head wearable display for combing image light with external scene light, the head wearable display comprising:
    an image source to generate the image light;
    a diffractive optical combiner including:
        an eyepiece body having an eye-ward side and an external scene side; and
        a plurality of diffractive optical element ("DOE") segments disposed within the eyepiece body, wherein the DOE segments are at least partially reflective to the image light incident through the eye-ward side of the eyepiece body and at least partially transmissive to external scene light incident through the external scene side of the eyepiece body, wherein the DOE segments are disjoint from each other and each of the DOE segments is a diffraction grating disposed along a different disjoint surface within the eyepiece body that is oriented at a different angle relative to the different disjoint surfaces of the other DOE segments, wherein the plurality of DOE segments operate to magnify and reflect the image light incident from an off-axis position to an eyebox sized area, wherein each of the different disjoint surfaces is a curved surface and each of the DOE segments is a reflective diffraction grating disposed on a different disjoint curved surface, wherein each of the DOE segments is a hybrid optical element that provides optical power in reflection due in a first part to a curvature of the curved surface and due in a second part to diffraction from the reflective diffraction grating disposed on the curved surface; and a frame assembly to support the image source and the diffractive optical combiner for wearing on a head of a user with the diffractive optical combiner positioned in front of an eye of the user.

11. The head wearable display of claim 10, wherein the curvature of the curved surface is selected to have optical power that at least partially corrects for astigmatism caused by the reflective diffraction grating when illuminated by the image light from an off-axis position.

12. The head wearable display of claim 10, wherein the eyepiece body comprises a material having a uniform index of refraction and surrounds the DOE segments on all sides.

13. The head wearable display of claim 12, wherein the DOE segments each comprise:

a two-dimensional ("2D") array of three-dimensional ("3D") diffraction element shapes disposed along a corresponding one of the different disjoint surfaces within the eyepiece body; and partially reflective elements each coating one of the 3D diffraction element shapes and conforming thereto, wherein the partially reflective elements collectively form a reflective diffraction grating having magnifying optical power for the image light incident through the eye-ward side of the eyepiece body, wherein the partially reflective elements pass the external scene light incident through the external scene side substantially without diffraction.

14. The head wearable display of claim 10, wherein each of the DOE segments comprises a reflective diffraction grating having apodized edges to reduce an efficiency of the reflective diffraction grating around a perimeter of the reflective diffraction grating.

15. An optical combiner, comprising:

an eyepiece body having an eye-ward side and an external scene side; and a plurality of diffractive optical element ("DOE") segments disposed within the eyepiece body, wherein the DOE segments are at least partially reflective to image light incident through the eye-ward side of the eyepiece body and at least partially transmissive to external scene light incident through the external scene side of the eyepiece body, wherein each of the DOE segments corresponds to a different portion of a hybrid optical element having a diffraction grating that follows a curved surface to correct for optical aberrations induced in reflected image light due to off-axis illumination, wherein the DOE segments are disjoint from each other and each of the DOE segments is disposed along a different disjoint surface within the eyepiece body and repositioned relative to their corresponding different portions of the hybrid optical element to reduce a collective thickness of the DOE segments relative to the hybrid optical element along a dimension extending from the eye-ward side to the external scene side, wherein each of the different disjoint surfaces is a curved surface and each of the DOE segments is a reflective diffraction grating disposed on a different disjoint curved surface, wherein each of the DOE segments is a hybrid optical element that provides optical power in reflection due in a first part to a curvature of the curved surface and due in a second part to diffraction from the reflective diffraction grating disposed on the curved surface.

\* \* \* \* \*